US010462027B2

(12) United States Patent
Chauhan et al.

(10) Patent No.: US 10,462,027 B2
(45) Date of Patent: Oct. 29, 2019

(54) CLOUD NETWORK STABILITY

(71) Applicant: Bank of America Corporation, Charlotte, NC (US)

(72) Inventors: Sandeep Kumar Chauhan, Madinaguda (IN); Anant Bondalapati Sharma, Hyderabad (IN); Sasidhar Purushothaman, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 206 days.

(21) Appl. No.: 15/682,774

(22) Filed: Aug. 22, 2017

(65) Prior Publication Data

US 2019/0068467 A1    Feb. 28, 2019

(51) Int. Cl.
*G06F 15/173*    (2006.01)
*H04L 12/26*    (2006.01)
*G06F 9/50*    (2006.01)

(52) U.S. Cl.
CPC ............ *H04L 43/08* (2013.01); *G06F 9/5072* (2013.01)

(58) Field of Classification Search
CPC ................................ H04L 43/08; G06F 9/5072
See application file for complete search history.

(56) References Cited

U.S. PATENT DOCUMENTS

| 8,504,689 | B2 | 8/2013 | Ferris et al. |
| 8,612,615 | B2 | 12/2013 | Ferris et al. |
| 8,713,147 | B2 | 4/2014 | Ferris et al. |
| 9,003,019 | B1 | 4/2015 | Guo |
| 9,354,939 | B2 | 5/2016 | Ferris et al. |
| 9,380,068 | B2 | 6/2016 | Iyer et al. |
| 9,419,913 | B2 | 8/2016 | Ferris et al. |
| 2009/0063482 | A1* | 3/2009 | Levanoni ............ G06F 16/2465 |
| 2017/0134237 | A1 | 5/2017 | Yang et al. |

* cited by examiner

*Primary Examiner* — John B Walsh
(74) *Attorney, Agent, or Firm* — Michael A. Springs

(57) ABSTRACT

In one embodiment, a system for cloud network stability includes a cloud network, a cloud instrument monitor, and a cloud network stability server. The cloud network includes a plurality of components. The cloud instrument monitor includes one or more instruments. Each of the one or more instruments may monitor the plurality of components. The cloud network stability server may include an interface and a processor operably coupled to the interface. The interface may receive an identification of a performance anomaly in the cloud network. A predictive analyzer implemented by a processor may identify a plurality of operational parameters associated with the performance anomaly; detect one or more operational issues associated with the plurality of operational parameters; calculate a network component failure using the detected one or more operational issues; and determine a remediation solution to resolve the network component failure.

20 Claims, 3 Drawing Sheets

CLOUD NETWORK STABILITY

TECHNICAL FIELD

The present invention relates generally to cloud computing and, more specifically, to cloud network stability.

BACKGROUND

Many enterprises have expansive cloud networks wherein a large number of devices utilize shared cloud components. To provide network services to the devices, the cloud components may be interconnected and depend on other cloud components. For example, to provide an application for a device, one cloud component (e.g., a server) may rely on other cloud components such as databases, applications, and routers, to provide the application to the device. Due to the expansiveness of the cloud network and the numerous interdependencies that exist between cloud components, a number of technical issues arise in cloud networks.

One technical challenge that occurs in a cloud network is proactively identifying the cause of a performance anomaly occurring in a cloud network. Often times a performance anomaly in one cloud component is a symptom of an impending or pre-existing technical problem occurring upstream or downstream in the network. Conventional systems for identifying and remediating these performance anomalies merely address the symptoms of the underlying technical issue. The technical issue may not be resolved until the network encounters a more catastrophic failure. Without the ability to proactively identify impending technical problems occurring in a cloud network, failures of network components may cause issues in the performance of applications, the loss or corruption of data, and loss of productivity due to the unavailability of key components.

SUMMARY

In accordance with the present disclosure, the systems and methods described in the present application provide a number of technical solutions to overcome the technical problems associated with cloud network stability. The solutions described herein allow for the proactive identification and remediation of cloud network components, including but not limited to improved CPU utilization, optimized memory storage, and improved cloud component deployment.

In one embodiment, a system for cloud network stability includes a cloud network, a cloud instrument monitor, and a cloud network stability server. The cloud network includes a plurality of components. The cloud instrument monitor includes one or more instruments. Each of the one or more instruments may monitor the plurality of components. The cloud network stability server may include an interface and a processor operably coupled to the interface. The interface may receive an identification of a performance anomaly in the cloud network. A predictive analyzer implemented by a processor may identify a plurality of operational parameters associated with the performance anomaly; detect one or more operational issues associated with the plurality of operational parameters; calculate a network component failure using the detected one or more operational issues; and determine a remediation solution to resolve the network component failure.

In certain embodiments, a cloud network stability method includes receiving an identification of a performance anomaly occurring in in the cloud network. The cloud network may include a plurality of components. The method may further include identifying plurality of operational parameters associated with the performance anomaly. The method includes detecting, via the processing circuitry, one or more operational issues associated with the plurality of operational parameters. The method may include calculating a network component failure using the one or more operational issues. The method may further include implementing a remediation solution to resolve the network component failure.

In some embodiments, a cloud network stability server includes an interface and a processor operably coupled to the interface. The interface may receive an identification of a performance anomaly occurring in in the cloud network, wherein the cloud network comprises a plurality of components. A predictive analyzer implemented by the processor may identify a plurality of operational parameters associated with the performance anomaly, detect one or more operational issues associated with the plurality of operational parameters, calculate a network component failure using the detected one or more operational issues, and determine a remediation solution to resolve the network component failure.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
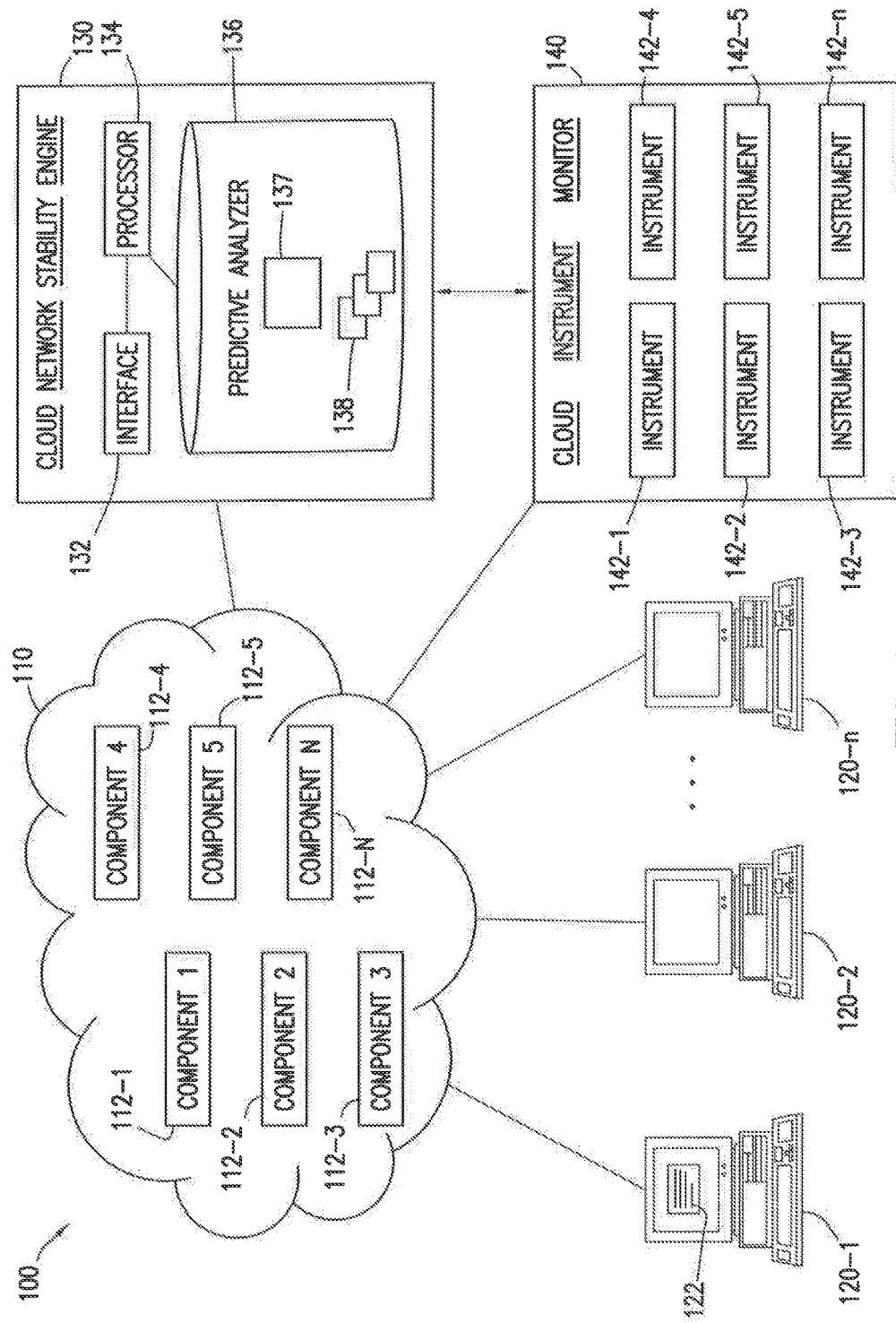
FIG. 1 is a schematic diagram of a system for cloud network stability, according an embodiment.
Figure 2:
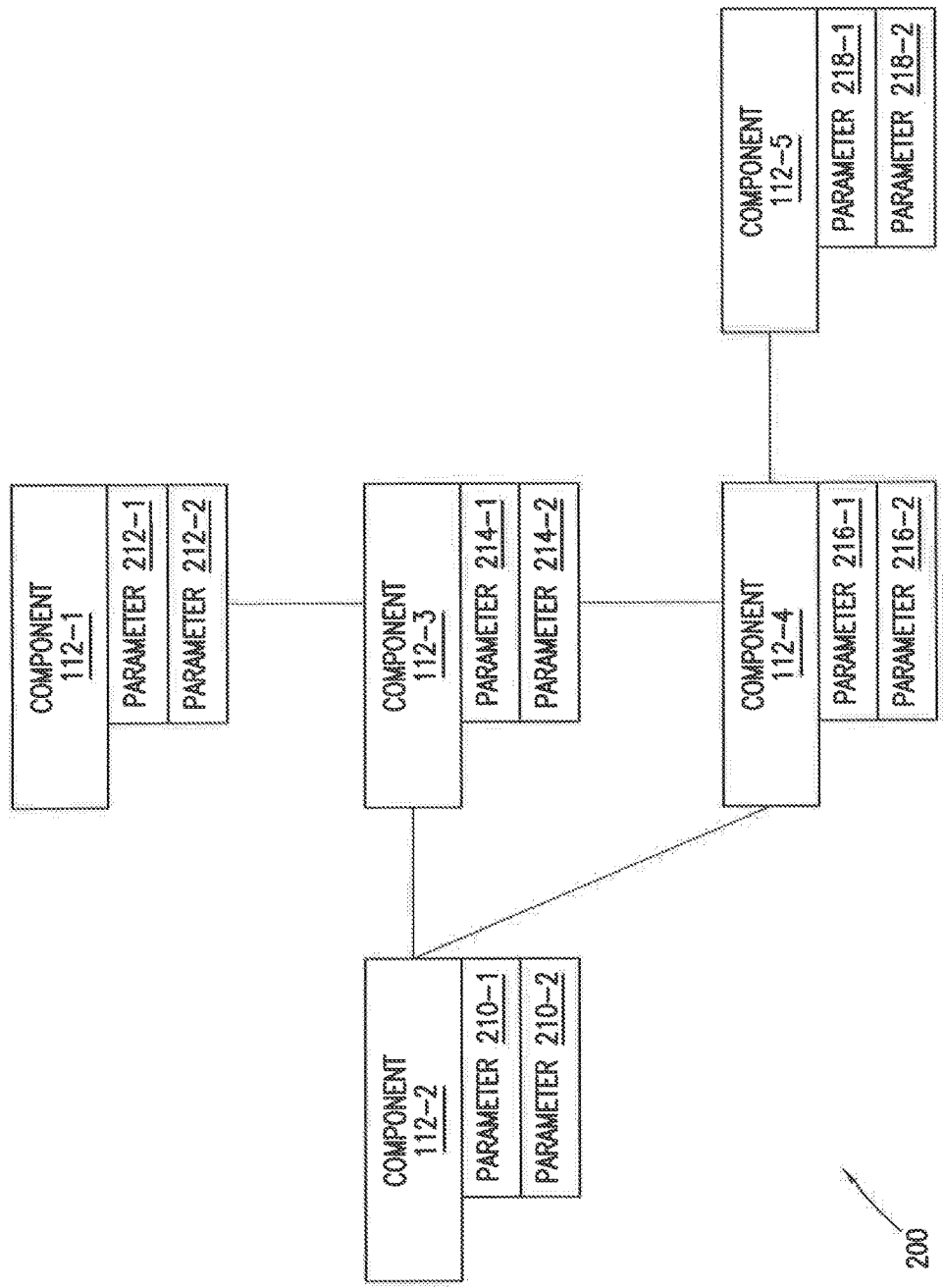
FIG. 2 is an example process of a cloud network stability engine ensuring cloud stability, according to an embodiment.
Figure 3:
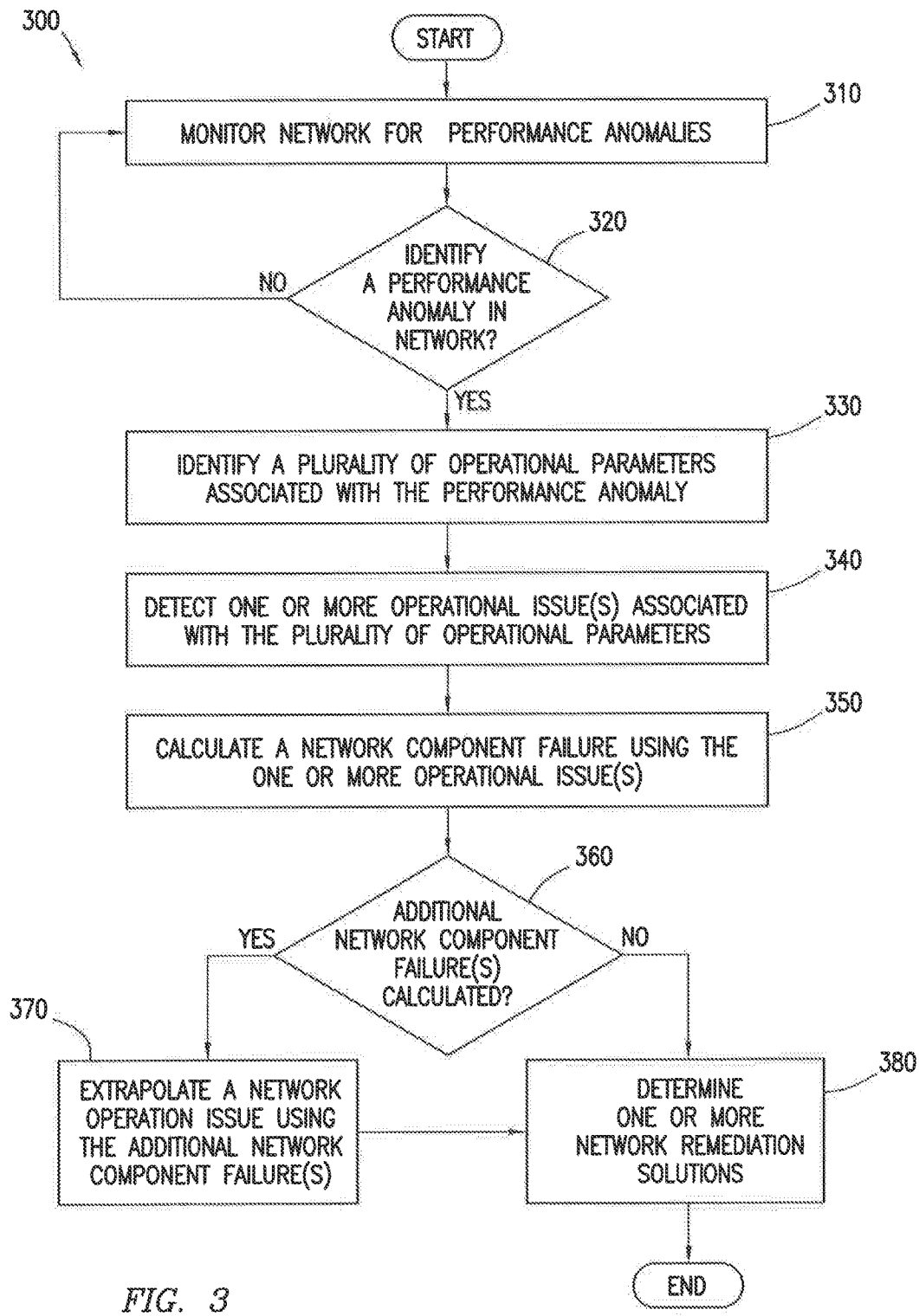
FIG. 3 is a flowchart for providing cloud network stability using the system of FIG. 1, according to an embodiment.

Embodiments of the present disclosure and its advantages are best understood by referring to FIGS. 1-3, like numerals being used for like and corresponding parts of the various drawings.

As explained above, cloud networks utilize a number of interrelated components, including hardware, software, middleware, and firmware to perform network operations and offer user services. Certain components may include databases, servers, hypervisors, load balancers, operating systems, applications, routers, and communication links among others. When the cloud network exhibits a performance anomaly, such as high component utilization, this may be an indication of an impending component failure within the cloud network. If a cloud component encounters an operational issue, network applications may fail, data may be lost, and additional components may become overloaded and subject to subsequent failure.

It is therefore advantageous to provide a system and method for cloud network stability. Technical issues arising in interconnected cloud networks, such as CPU overutilization, memory usage, and cloud component scarcity, are problems specifically arising in the realm of computer networks. Embodiments of the present disclosure provide technical solutions to these network centric technical issues. By proactively identifying current performance anomalies, embodiments of the present disclosure may monitor parameters associated with network components that are related to the performance anomaly. Embodiments of the present disclosure may then identify technical symptoms associated with these parameters in order to diagnose a likely cause of the performance anomaly. Certain embodiments of the present disclosure provide unconventional technical solutions and advantages over the conventional methods of monitoring cloud performance and maintenance. For example, certain embodiments provide an unconventional cloud network stability system and method, which proactively detects and resolves cloud component issues before the components cause an operational issue in the network. Technical advantages of certain embodiments may include the proactive identification and remediation of cloud network components, including but not limited to improved CPU utilization, optimized memory storage, and improved cloud component deployment. FIGS. 1-3 will now describe the foregoing system and methods in greater detail.

FIG. 1 is a schematic diagram of a system for cloud network stability, according an embodiment. System 100 includes cloud network 110 comprising components 112-1 through 112-N, workstations 120-1 through 120-N, a cloud network stability engine 130, and a cloud instrument monitor 140. Elements of system 100 may be internal to an enterprise. For example, one or more workstations 120, cloud network stability engine 130, and/or cloud instrument monitor 140 may be associated with an enterprise. An enterprise may be an individual, business, company, or other organization. Non-limiting examples of an enterprise may include a clothing store, an online sales company, and a financial institution. An enterprise may include one or more lines of business, subsidiaries, or parent organizations.

Cloud network 110 represents any suitable network operable to provide the sharing of components 112 and/or facilitate communication between the components of system 100. Cloud network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Cloud network 110 may comprise components 112-1 through 112-N (collectively components 112 or generically as component 112). Components 112 represent any suitable cloud network 110 infrastructure and/or elements that cloud network 110 may use to provide cloud services to one or more workstations 120. Components 112 may comprise one or more physical hosts, physical network components, physical data stores, virtual resources. For example, components 112 may include, but are not limited to, servers, databases, routers, hypervisors, operating systems, virtual machines, software, hardware, firmware, middleware, and load balancers, among others. In some embodiments, a cloud service provider may provide portions of cloud network 110 to offer virtual resources on cloud network 110 to workstations 120. Moreover, components 112 may be part of any suitable layer of cloud network 110 including, but not limited to an application layer, a network layer, and a system layer, among others.

Components 112 may be geographically distributed. For example, some of components 112 may be configured in a cluster at a single location while other components 112 may be configured into another cluster at another location. The clusters may be coupled over networks or other interfaces to provide the physical infrastructure for a distributed cloud network 110. Alternatively, in certain embodiments, cloud network 110 comprises components 112 located at a single location.

Workstations 120-1 through 120-N (collectively workstations 120 or generically as workstation 120) enable one or more users to monitor, administer, or otherwise interact with cloud network 110, cloud network stability engine 130 and/or cloud instrument monitor 140. Workstation 120 may include one or more laptops, personal computers, monitors, display devices, handheld devices, smartphones, servers, user input devices, or other suitable components for enabling user input. Workstations 120 may utilize resources provided by cloud network 110, such as one or more applications and/or operating systems. One or more workstations 120 may include cloud network stability engine 130 and/or cloud instrument monitor 140. Workstations 120 may be a part of an enterprise or could remotely access an enterprise. In the illustrated embodiment, workstations 120 include a graphical user interface (GUI) 122.

GUI 122 represents any suitable graphical arrangement of information presented to one or more users, network administrators, employees, and/or vendors. For example, GUI 122 may display information received from a website and/or cloud network stability engine 130. GUI 122 is generally operable to tailor and filter data entered by and presented to a user. GUI 122 may provide a user with an efficient and user friendly presentation of information. GUI 122 may comprise a plurality of displays having interactive fields, pull-down lists, and buttons operated by users. GUI 122 may include multiple levels of abstraction including groupings and boundaries. It should be understood that the term GUI 122 may be used in the singular or in the plural to describe one or more GUIs 122 in each of the displays of workstations 120.

Cloud network stability engine 130 represents any suitable components that are operable to proactively identify potential operational issues, component 112 failures, and remediation solutions in cloud network 110. Cloud network stability engine 130 may include a network server, remote server, mainframe, host computer, workstation, webserver, personal computer, file server, or any other suitable device operable to communicate with other devices and process data. In some embodiments, cloud network stability engine 130 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of cloud network stability engine 130 may be performed by any suitable combination of one or more servers or other components at one or more locations. In the embodiment where cloud network stability engine 130 is one or more servers, the servers may be public or private servers, and each server may be a virtual or physical server. The server may include one or more servers at the same or at remote locations. Cloud network stability engine 130 may also include any suitable component that functions as a server. In some embodiments, workstation 120 and cloud instrument monitor 140 may be integrated with cloud network stability engine 130 or they may operate as part of the same device or devices.

In the illustrated embodiment, cloud network stability engine 130 includes an interface 132, a processor 134, and a memory 136. Memory 136 comprises a predictive analyzer 137 and a remediation database 138. In one or more embodiments, interface 132, processor 134, and/or memory 136 may be communicatively coupled via one or more buses. For example, a bus may include one or more of a peripheral component interconnect (PCI) bus, a serial peripheral interface (SPI) bus, an inter-integrated circuit (I2C) bus, an enhanced serial peripheral interface (eSPI) bus, a system management bus (SMBus), a universal serial bus, and a low pin count (LPC) bus, among others. In one or more embodiments, interface 132 and memory 136 may be communicatively coupled to processor 134 via one or more of a PCI-Express (PCIe) root complex and one or more PCIe switches, among others.

Interface 132 represents any suitable device operable to receive information from cloud network 110 (e.g., cloud components 112), communicate with cloud instrument monitor 140, communicate with workstations 120, transmit information through cloud network 110, perform suitable processing of the information, communicate to other devices, or any combination thereof. For example, interface 132 may facilitate communicate with cloud instrument monitor 140 and/or workstations 120 to proactively identify operational issues and potential network component failures with cloud network 110. Interface 132 represents any port or connection, real or virtual, including any suitable hardware and/or software, including protocol conversion and data processing capabilities, to communicate through a LAN, WAN, or other communication system that allows cloud network stability engine 130 to exchange information with cloud network 110, workstation 120, cloud instrument monitor 140, or any other components of system 100.

Processor 134 communicatively couples interface 132 and memory 136 and controls the operation of cloud network stability engine 130. Processor 134 includes any hardware and software that operates to control and process information. Processor 134 may execute computer-executable program instructions stored in memory 136. Processor 134 may include, but is not limited to, a microprocessor, a central processing unit (CPU), an application specific integrated circuit (ASIC), a graphics processing unit (GPU), a digital signal processor (DSP), and/or state machines among others. In one or more embodiments, processor 134 may include processing circuitry that may interpret and/or execute program instructions and/or process data, among others. For example, processor 134 may include one or more of a system, a device, and an apparatus that may interpret and/or execute program instructions and/or process data, among others.

In one or more embodiments, processor 134 may execute instructions when implementing one or more systems, flowcharts, methods, and/or processes described herein. In one example, processor 134 may execute processor instructions stored in memory 136 in implementing one or more systems, flowcharts, methods, and/or processes described herein (e.g., predictive analyzer 137).

Memory 136 stores, either permanently or temporarily, data, operational software, other information for processor 134, other components of cloud network stability engine 130, or other components of system 100. Memory 136 includes any one or a combination of volatile or non-volatile local or remote devices suitable for storing information. For example, memory 136 may include RAM, ROM, flash memory, magnetic storage devices, optical storage devices, network storage devices, cloud storage devices, solid state devices, or any other suitable information storage device or a combination of these devices.

Memory 136 may store information in one or more databases, file systems, tree structures, any other suitable storage system, or any combination thereof. Furthermore, different information stored in memory 136 may use any of these storage systems. Moreover, any information stored in memory 136 may be encrypted or unencrypted, compressed or uncompressed, and static or editable. Although illustrated as including particular modules, memory 136 may include any suitable information for use in the operation of cloud network stability engine 130.

Cloud instrument monitor 140 represents any suitable hardware and/or software operable to monitor the operation, performance, and/or efficiency of components 112 in cloud network 110. Cloud instrument monitor 140 may monitor the entire cloud network 110 or alternatively, some portion thereof. In the illustrated embodiment, cloud instrument monitor 140 comprises instruments 142-1 through 142-N (collectively instruments 142 and generically as instrument 142). Instruments 142 represent any suitable hardware or software operable to monitor, analyze, track, and/or identify the operation of components 112. For example, cloud instrument monitor 142-1 may represent a combination of hardware and/or software that monitors the CPU utilization of a server (e.g., component 112-3). As another example, instrument 142-4 may represent any combination of hardware and/or software that monitors component 112 availability in cloud network 110. In some embodiments, instruments 142 may be integrated with the component 112 that the instrument 142 monitors.

As discussed in greater detail in FIG. 2, in certain embodiments, cloud instrument monitor 140 may monitor one or more operational parameters associated with components 112. For example, in some embodiments, component 112-1 may be a server and instrument 142-1 may monitor the server's CPU utilization (i.e. an operational parameter associated with the server). As another example, component 112-1 may be a database and instrument 142-1 may monitor the available storage capacity of the database.

Cloud instrument monitor 140 may be a separate system from cloud network 110. In other embodiments, cloud instrument monitor 140 may be implemented on cloud network 110. For example, portions of or all of cloud instrument monitor 140 may be implemented on one or more of physical components 112-1 through 112-N or on other components of cloud network 110, such as components of cloud network 110's physical infrastructure. In certain embodiments, cloud instrument monitor 140 is distributed across multiple systems.

Cloud instrument monitor 140 may with other monitoring systems, tools, or apparatuses, of cloud network 110 to receive information about activity on cloud network 110. For example, each component 112 in cloud network 110 may include its own monitoring tool, which may communicate with cloud instrument monitor 140. As another example, the infrastructure of cloud network 110 may include monitoring systems that monitor activity including the activity of the cloud service provider's employees or other higher-level activity on cloud network 110. Events detected through cloud network 110 may be communicated to cloud instrument monitor 140. In certain embodiments, cloud instrument monitor 140 may directly monitor events at one or more components 112 of cloud network 110. The events monitored by cloud instrument monitor 140 may include any event that may occur on one or more components 112. For example, events may comprise one or more of an access, read/write, or use of a component 112. In certain embodiments, cloud instrument monitor 140 may determine which components 112 are associated with a specific workstation 120.

Identifying Cloud Network Performance Anomalies & Operational Issues

In the illustrated embodiment, memory 136 includes predictive analyzer 137 to analyze performance anomalies in cloud network 110 by identifying operational parameters associated with the performance anomaly, monitor the operational parameters to detect one or more operational issues associated with the operational parameters, and use the operational issues to calculate a network component that is likely to fail. In some embodiments, predictive analyzer 137 may then determine a remediation solution to resolve the impending network component failure. In this manner, predictive analyzer 137 may proactively identify potential components 112 of cloud network 110 that are likely to experience failure due to an underlying network component failure.

To further illustrate, in one embodiment, cloud instrument monitor 140 may identify a performance anomaly in cloud network 110 using one or more instruments 142. For instance, cloud instrument monitor 140 may determine that a server (component 112-1) has a CPU utilization of 85%. In some embodiments, cloud instrument monitor 140 may determine that a CPU utilization greater than a predetermined usage (e.g., 80%) should be identified as a performance anomaly for cloud network 110. A sliding window may be used to identify when a performance anomaly occurs. For example, a cloud network administrator using workstation 120-1 may set the sliding window to a higher value than 80% so that a performance anomaly is only identified once the higher value is exceeded. A sliding window may be customized to fit any suitable performance anomaly and may use any suitable metrics. The sliding window may be implemented and adjusted by a user through workstation 120.

Once cloud instrument monitor 140 identifies a performance anomaly in cloud network 110, cloud instrument monitor 140 may transmit the identified performance anomaly to cloud network stability engine 130. Based on the identified performance anomaly, predictive analyzer 137 may identify one or more operational parameters associated with the performance anomaly. For example, in the foregoing example, the performance anomaly is a server CPU utilization for component 112-1. Predictive analyzer 137 may identify a plurality of operational parameters associated with the server (e.g., component 112-1) and/or operational parameters associated with other components 112-2, -3, -N. For instance, predictive analyzer 137 may identify operational parameters associated with a database (e.g., component 112-2) used by the server, and an operational parameter associated with an application running on the server (e.g., component 112-3). In this manner, predictive analyzer 137 may determine a map of components 112 that interact or are likely to be related to the performance anomaly.

Once predictive analyzer 137 identifies the plurality of operational parameters associated with the performance anomaly, predictive analyzer 137 may perform any suitable steps, method, and/or algorithm to monitor and detect any potential operational issues associated with the plurality of operational parameters. In some embodiments, predictive analyzer 137 may simply monitor the operational parameters for a specific period. In some embodiments, predictive analyzer 137 may use cloud instrument monitor 140 to monitor the identified operational parameters.

To monitor and detect operational issues, In some embodiments, predictive analyzer 137 may apply an iterative monitoring process. Predictive analyzer 137 may determine any suitable number of iterations (e.g., 5, 10, 50, 100 etc.) for the iterative monitoring process. In some embodiments, a user at workstation 120 may set the number of iterations for a given performance anomaly. During each iteration, predictive analyzer 137 may monitor the identified operational parameters of the components 112 associated with the performance anomaly. If predictive analyzer 137 identifies a previously unidentified operational issue, predictive analyzer may log the new operational issue and/or the status of the performance anomaly. For instance, using the above example, the CPU utilization may have been at 85% during the first four iterations. During the fifth iteration, predictive analyzer 137 may detect an operational issue with an operational parameter being monitored. For instance, a page fault error may occur due to a request from an application (component 112-3). This may cause the CPU utilization to rise to 88%. Predictive analyzer 137 may identify the page fault as an operational issue and log the issue, for example, in a remediation database 138. In certain embodiments, if predictive analyzer 137 detects a previously unidentified operational issue, predictive analyzer 137 may start the iterative monitoring process over.

In certain embodiments, predicative analyzer 137 may log the effect that the page fault had on CPU utilization. In this manner, predictive analyzer 137 may develop a historical database of performance anomalies, operational issues, operational parameters, and/or any other suitable information. This may allow predictive analyzer 137 to learn over time which operational parameters and operational issues are closely associated with a performance anomaly, including how a performance anomaly affects components 112 in cloud network 110.

Predicative analyzer 137 may monitor and detect operational issues utilizing any suitable process, including but not limited to utilizing real-time data, historic data, or a combination of both. For example, predictive analyzer 137 may monitor the real-time performance metrics of an operational parameter to determine how the real-time performance metrics compare to typical performance metrics or historic performance metrics. For instance, predictive analyzer 137 may compare a current memory usage percentage to a standard value to determine if an operational issue exists. In some embodiments, predictive analyzer 137 may compare a current memory usage to a historic memory usage recorded during a similar or same performance anomaly to detect whether the current memory usage should be identified as a operational issue. In this manner, predictive analyzer 137 may more accurately determine whether a given performance metric should be identified as an operational issue.

In some embodiments, the detected operational issues may merely be a symptom or indication of an underlying or impending network component failure. Accordingly, once predictive analyzer 137 has detected one or more operational issues associated with the operational parameters and, thus, the performance anomaly, predictive analyzer 137 may calculate a network component failure.

Calculating Network Component Failures a Remediation Solutions

To illustrate, a first operational issue may be a resource issue (represented as $E_1$) and a second operational issue may be a capacity issue (represented as $E_2$). A network component failure may be a function of the identified operational issues (e.g., $Z_1 = E_1, E_2$). Accordingly, predictive analyzer 137 may calculate a network component failure as a function of the detected operational issues. For example, a high CPU utilization performance anomaly may cause predictive analyzer 137 to identify and detect resource and capacity operational issues caused by application and database components 112 associated with the performance anomaly. Predictive analyzer 137 may map these operational issues and determine that the network component failure causing these issues is coming from an upstream network connection in cloud network 110.

In certain embodiments, predictive analyzer 137 may calculate additional network component failures based on the detected operational issues. For example, in addition to detecting $E_1$ and $E_2$, based on the operational issues detected with the operational parameters, predictive analyzer 137 may also detect operational issues $E_3$, $E_4$, and $E_5$. Using $E_1$-$E_5$, predictive analyzer 137 may calculate $Z_1$, $Z_2$, $Z_4$ and $Z_5$. In some embodiments, once predictive analyzer 137 has calculated $Z_1$, $Z_2$, $Z_4$ and $Z_5$, predictive analyzer 137 determine a network operation issue. A network operation issue may be indicative of a larger or more systemic problem within cloud network 110.

In some embodiments, predictive analyzer 137 may extrapolate issue based on the additional network component failures. A network operation issue may be indicative a larger or more system problem occurring in cloud network 110. For example, using the above example, predictive analyzer 137 may determine that network component failure $Z_3$ is a likely network component failure in view of the additional network component failures. In this manner, predictive analyzer 137 may analyze existing data and extrapolate future potential failures in cloud network 110.

In certain embodiments, once predictive analyzer 137 determines a network component failure, predictive analyzer 137 may implement one or more remediation solutions. Predictive analyzer may implement any suitable remediation solution to prevent or fix the network component failure. Non-limiting examples of potential remediation solutions include restarting a component 112, allocating additional components 112 in cloud network 110. In some embodiments, the remediation solution may be a pre-configured solution depending on the calculated network component failure.

In some embodiments, predictive analyzer 137 may update a remediation database with the one or more of the remediation solutions implemented, the network component failure and/or network operation issue calculated, the performance anomaly, and the one or more operational issues. In this manner, predictive analyzer 137 may utilize the stored issues and remediation solutions and further refine the ability for predictive analyzer 137 to proactively identify, detect, and remediate issues in cloud network 110.

One or more systems, processes, and/or methods may utilize one or more machine learning systems, processes, and/or methods that may maintain and track data relationships over time to provide cloud network stability. For example, the one or more machine learning systems, processes, and/or methods may determine a strength of a relationship between or among components 112, performance anomalies, remediation solutions, and operational issues. Components 112 and/or operational parameters may be classified and/or tagged, based on one or more classifications, and may be provided to the one or more machine learning systems, processes, and/or methods. For example, the one or more machine learning systems, processes, and/or methods may utilize components 112 and tags of components 112 within a graph system to determine additional relationships between or among elements and/or to extend a data graph (e.g., a database) by constructing new tag attributes to capture the additional relationships. For instance, a specific component 112-1 may be correlated with information that predictive analyzer is evaluating (identifying operational parameters; calculating a network component failure; and determining a remediation solution among others). The machine learning systems, processes, and/or methods may identify the correlation and make informed decisions regarding whether a specific operational parameter should be identified, whether a network component failure is a function of one or more operational issues; and whether a remediation solution will resolve a network component failure, among others.

In one or more embodiments, the one or more machine learning systems, processes, and/or methods may statistically measure a strength of an affinity between or among data objects, which may allow and/or may permit one or more results to be specified within one or more confidence intervals. For example, one or more static classification rules and/or tags may be replaced with one or more dynamic correlation scores. For instance, the one or more machine learning systems, processes, and/or methods may be initiated with known related elements, and the one or more machine learning systems, processes, and/or methods may derive additional related data based on one or more correlations and/or one or more stochastics.

In one or more embodiments, relationship discovery may be dynamic and/or may be able to captures evolving one or more relationships between or among data as the data is utilized by one or more systems, processes, and/or methods. For example, the data may be utilized by one or more systems, processes, and/or methods of a cloud computing infrastructure and/or environment. In this fashion, the one or more machine learning systems, processes, and/or methods may provide one or more means to place attributes and/or tags on data objects to determine whether a specific component 112 or operational component should be monitored and/or used to calculate a network component failure. Accordingly, in some embodiments, predictive analyzer 137 may apply a machine learning technique to components 112 and/or operational parameters associated with a performance anomaly. The machine learning technique may identify one or more operational parameters correlated with the performance anomaly.

Upon determining one or more network component failure(s) and/or one or more network operation issues, predictive analyzer 137 may determine and implement one or more remediation solutions. For example, predictive analyzer 137 determines that the performance anomaly is caused by a communications link failure between two components 112, predictive analyzer 137 may send an alert to a user through a workstation 120. In some embodiments, predicative analyzer 137 may provide additional or alternative remediation solutions such as allocating additional components, CPU resources, or additional memory.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the disclosure. For example, in certain embodiments, predictive analyzer 137 may identify one or more components 112 in addition to or instead of identifying operational parameters for monitoring. As another example, although the illustrated embodiment shows cloud instrument monitor 140 as being separate from cloud network stability engine 130, in some embodiments, cloud instrument monitor 140 and cloud network stability engine 130 may be combined. Any suitable logic may perform the functions of system 100 and the components within system 100.

FIG. 2 is an example process 200 of a cloud network stability engine ensuring cloud stability, according to an embodiment. The illustrated embodiment is an example mapping that cloud network stability engine 130 may perform once a performance anomaly has been detected. The illustrated embodiment shows components 112-1 through 112-5. Each component 112-1 through 112-5 has associated operational parameters. For instance, component 112-1 has parameters 212-1 and parameter 212-2. The illustrated associated parameters are merely an example. A component 112 may have more or fewer parameters.

Components 112-1 through 112-5 also have indications showing the interdependent nature of the components 112. For instance, component 112-1 is associated with component 112-3; component 112-2 is associated with both components 112-3 and 112-4; and component 112-4 is associated with component 112-5.

To illustrate the example process 200, cloud network stability engine 130 may receive a notice from cloud instrument monitor 140 that a performance anomaly has been detected in cloud network 110. For instance, cloud instrument monitor 140 may detect that cloud component usage is at 55%. An enterprise may determine that an optimum cloud usage should be less than 40%. Therefore, cloud instrument monitor 140 may identify the 55% cloud usage as a performance anomaly and send a notification to cloud network stability engine 130 identifying the performance anomaly.

Cloud network stability engine may then identify a plurality of operational parameters associated with the performance anomaly. Cloud network stability engine 130 may use any suitable method, technique, or algorithm to determine which operational parameters to identify. As described above in reference to FIG. 1, in some embodiments, cloud network stability engine 130 may use a machine learning technique to determine which components 112 and/or operational parameters should be monitored to detect operational issues associated with the performance anomaly.

In the illustrated embodiment, cloud network stability engine 130 may identify components 112-1 through 112-5 as being associated with the performance anomaly. In some embodiments, cloud network stability engine 130 may additionally or alternatively identify operational parameters associated with the performance anomaly. For instance, cloud network stability engine 130 may identify parameter 210-1, parameter 214-2, parameter 216-1, and parameter 218-1 as operational parameters associated with the performance anomaly.

Cloud network stability engine 130 may monitor the identified operational parameters to detect one or more operational issues. Any suitable monitoring technique may be applied by cloud network stability engine 130 to monitor and detect an operational issue. For example, cloud network stability engine may perform an iterative monitoring process. During each iteration of the monitoring process, cloud network stability engine 130 may monitor the operation of the identified parameters and determine whether the parameter is operating normally (or within a tolerance of normal operation) or whether the parameter is encountering an operational issue. If network stability engine 130 does not detect an issue, cloud network stability engine 130 may perform additional iterations until the monitoring process is complete. In some embodiments, if cloud network stability engine 130 detects an operational issue associated with an operational parameter, cloud network stability engine 130 may log the issue in remediation database 138. In this manner, cloud network stability engine 130 may learn from and improve the monitoring and detecting process each time cloud network stability engine 130 investigates a performance anomaly.

During the iterative monitoring process, cloud network stability engine 130 may identify one or more operational issues associated with the plurality of operational parameters. For instance, cloud network stability engine 130 may detect an operational issue (e.g., increased latency) associated with parameter 216-1, which may be associated with component 112-4 (e.g., a cloud network 110 node). Similarly, cloud network stability engine 130 may detect another operational issue (e.g., delayed response time) associated with parameter 218-2, which may be associated with component 112-5 (e.g., a database). Moreover, cloud network stability engine 130 may determine that a third operational issue (e.g., an application is timing out) associated with parameter 210-1, which may be associated with component 112-2 (e.g., an application).

Cloud network stability engine 130 may calculate a network component failure using the detected operational issues. Using the above example, cloud network stability engine may infer from the application time out, increased latency and delayed response time operational issues that a connection between component 112-4 and component 112-5 is faulty. Based on the calculated network component failure (e.g., the faulty connection between component 112-4 and 112-5), cloud network stability engine 130, may determine a remediation solution to resolve the failure. For example, a remediation solution may be to replace the network connection between component 112-4 and 112-5. In some embodiments, cloud network stability engine 130 may communicate the remediation solution to one or more workstations 120.

In some embodiments, once the remediation solution is implemented, cloud network stability engine 130 may determine that the performance anomaly has been resolved. Upon resolving the issue, cloud network stability engine 130 may store information about the performance anomaly, the identified operational parameters, the detected operational issues, the calculated network component failure and/or the remediation solution in remediation database 138.

The foregoing description of FIG. 2 was merely illustrate of an example embodiment of the present disclosure. FIG. 3 provides an additional description of an example embodiment.

FIG. 3 is a flowchart 300 for providing cloud network stability using the system of FIG. 1, according to an embodiment. At step 310, cloud instrument monitor 140 may monitor cloud network 110 for one or more performance anomalies. Non-limiting examples of performance anomalies may include server CPU utilization, memory usage, and resource availability among others.

At step 320, cloud instrument monitor 140 determines whether cloud network 110 has a performance anomaly. If cloud instrument monitor 140 identifies a performance anomaly, then the sequence may proceed to step 330. If a performance anomaly is not identified then the sequence may return to step 310 and continue monitoring the cloud network 110.

At step 330, cloud network stability engine 130 may identify a plurality of operational parameters associated with the identified performance anomaly. For example, predictive analyzer 137 may identify a plurality of operational parameters associated with components 112 that are likely related to the performance anomaly. In some embodiments, predicative analyzer 137 may utilize historic information stored in one or more databases (e.g., remediation database 138) to select the components 112 that are likely related to the performance anomaly. In some embodiments, predicative analyzer 137 may use a machine learning technique to identify the components 112 and/or the operational parameters. In some embodiments, once predictive analyzer 137 identifies the operational parameters and/or components 112 associated with the performance anomaly, predictive analyzer 137 may generate a map of components 112 that interact or are likely to be related to the performance anomaly. This may help a user at a workstation visualize the potential problem components 112 related to the performance anomaly.

At step 340, predictive analyzer 137 may detect one or more operational issue(s) associated with the plurality of operational parameters. Predictive analyzer 137 may utilize any suitable process to detect an operational issue. For example, predictive analyzer 137 may monitor the real-time performance metrics of an operational parameter to determine how the real-time performance metrics compare to typical performance metrics or historic performance metrics.

At step 350, predictive analyzer 137 may calculate a network component failure using the one or more detected operational issue(s). In some embodiments, predictive analyzer 137 may calculate a network component failure as a function of the detected operational issues. For instance, predictive analyzer 137 may infer a network component failure from the combination of multiple operational issues detected. Predictive analyzer 137 may map operational issues and determine where a network component failure causing these issues is coming from (e.g. from an upstream cloud network 110 component 112).

At step 360, predicative analyzer 137 may determine if additional network component failure(s) have been calculated. For example, in some embodiments, multiple operational issues may be detected by predictive analyzer 360. Based on the multiple operational issues, predicative analyzer 137 may calculate additional network component failure(s) occurring in cloud network 110. If additional network component failures have been calculated the sequence may proceed to step 370. If additional network component failures have not been calculated, the sequence may proceed to step 380.

At step 370, predictive analyzer 137 may extrapolate a network operation issue using the additional network component failure(s). For example, a combination of network component failures may point to a larger or systemic issue in cloud network 110. In some embodiments, the calculated network component failures may indicate that an additional non-calculated network component failure likely exists. Predicative analyzer 137 may predict the existence of the non-calculated network component failure from the calculated network component failures. Predicative analyzer 137 may then monitor components 112 or operational parameters associated with the non-calculated network component failure.

At step 380, predictive analyzer 137 may determine and/or implement one or more network remediation solutions. For instance, predicative analyzer 137 may provide additional or alternative remediation solutions such as allocating additional components, CPU resources, or additional memory. In some embodiments, the remediation solution implemented by predictive analyzer 137 may be determined using machine learning techniques or be determined using a historical database of remediation solutions that have successfully been implemented to resolve the network component failure(s) and/or network operation issue(s) in the past.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A cloud network stability system, comprising:
a cloud network comprising a plurality components;
a cloud instrument monitor operably coupled to the cloud network, the cloud instrument monitor comprising one or more instruments, wherein each of the one or more instruments is configured to monitor the plurality of components; and
a cloud network stability server communicatively operably to the cloud network and the cloud instrument monitor, the cloud network stability server comprising:
an interface operable to:
receive, from the cloud instrument monitor, an identification of a performance anomaly in the cloud network, wherein the identification of the performance anomaly identifies an operational issue associated with a first component from the plurality of components; and
a predictive analyzer implemented by a processor operably coupled to the interface, and configured to:
determine a mapping of components that interact with each other from among the plurality of components;
identify one or more components from the plurality of components that interact with the first component based on the determined mapping;
monitor a plurality of operational parameters for the one or more components that interact with the first component;
detect one or more operational issues associated with the plurality of operational parameters for the one or more components that interact with the first component;
calculate a network component failure using the detected one or more operational issues, wherein the network component failure identifies a faulty connection associated with the first component; and
determine a remediation solution to resolve the network component failure.

2. The cloud network stability system of claim 1, wherein to detect one or more operational issues associated with the plurality of operational parameters, the predictive analyzer is configured to apply an iterative monitoring process, wherein during each iteration of the iterative monitoring process, the predictive analyzer monitors the plurality of operational parameters associated with the performance anomaly.

3. The cloud network stability system of claim 2, wherein upon detecting one or more operational issues, the predictive analyzer is further configured to:
identify a change in the performance anomaly; and
start the iterative process over.

4. The cloud network stability system of claim 1, wherein the predictive analyzer is further configured to:
determine that one or more additional network component failures have been calculated; and
extrapolate a network operation issue using the additional network component failures.

5. The cloud network stability system of claim 1, wherein a sliding window is used to identify the performance anomaly in the cloud network.

6. The cloud network stability system of claim 1, wherein the remediation solution is one selected from the group comprising: restart one of the plurality of components and allocate additional components in the cloud network.

7. The cloud network stability system of claim 1, wherein the cloud network stability server is further configured to update a remediation database with the remediation solution, the network failure, and the one or more operational issues.

8. A cloud network stability method, comprising:
receiving, at an interface, an identification of a performance anomaly occurring in the cloud network, wherein:
the cloud network comprises a plurality of components; and
the identification of the performance anomaly identifies an operational issue associated with a first component from the plurality of components;
determining, via processing circuitry operably coupled to the interface, a mapping of components that interact with each other from among the plurality of components;
identifying, via the processing circuitry, one or more components from the plurality of components that interact with the first component based on the determined mapping;
monitoring, via the processing circuitry, a plurality of operational parameters for the one or more components that interact with the first component;
detecting, via the processing circuitry, one or more operational issues associated with the plurality of operational parameters;
calculating, via the processing circuitry, a network component failure using the one or more operational issues, wherein the network component failure identifies a faulty connection associated with the first component; and
implementing a remediation solution to resolve the network component failure.

9. The cloud network stability method of claim 8, wherein detecting the one or more operational issues associated with the plurality of operational parameters comprises:
applying an iterative monitoring process, wherein during each iteration of the iterative monitoring process, the predictive analyzer monitors the plurality of operational parameters associated with the performance anomaly.

10. The cloud network stability method of claim 9, wherein upon detecting one or more operational issues, the method further comprises:
identifying a change in the performance anomaly; and
starting the iterative process over.

11. The cloud network stability method of claim 8, wherein the method further comprises:
determining that one or more additional network component failures have been calculated; and
extrapolating a network operation issue using the additional network component failures.

12. The cloud network stability method of claim 8, wherein a sliding window is used to identify the performance anomaly in the cloud network.

13. The cloud network stability method of claim 8, wherein the remediation solution is one selected from the group comprising: restart one of the plurality of components and allocate additional components in the cloud network.

14. The cloud network stability method of claim 8, wherein the method further comprises updating a remediation database with the remediation solution, the network component failure, and the one or more operational issues.

15. A cloud network stability server, comprising:
an interface operable to:
receive an identification of a performance anomaly occurring in the cloud network, wherein:
the cloud network comprises a plurality of components; and
the identification of the performance anomaly identifies an operational issue associated with a first component from the plurality of components; and
a predictive analyzer implemented by a processor operably and coupled to the interface, the predictive analyzer configured to:
determine a mapping of components that interact with each other from among the plurality of components;
identify one or more components from the plurality of components that interact with the first component based on the determined mapping;
monitor a plurality of operational parameters for the one or more components that interact with the first component;
detect one or more operational issues associated with the plurality of operational parameters for the one or more components that interact with the first component;
calculate a network component failure using the detected one or more operational issues, wherein the network component failure identifies a faulty connection associated with the first component; and
determine a remediation solution to resolve the network component failure.

16. The cloud network stability server of claim 15, wherein to detect one or more operational issues associated with the plurality of operational parameters, the predictive analyzer is configured to apply an iterative monitoring process, wherein during each iteration of the iterative monitoring process, the predictive analyzer monitors the plurality of operational parameters associated with the performance anomaly.

17. The cloud network stability server of claim 16, wherein upon detecting one or more operational issues, the predictive analyzer is further configured to:
identify a change in the performance anomaly; and
start the iterative process over.

18. The cloud network stability server of claim 15, wherein the predictive analyzer is further configured to:
determine that one or more additional network component failures have been calculated; and
extrapolate a network operation issue using the additional network component failures.

19. The cloud network stability server of claim 15, wherein a sliding window is used to identify the performance anomaly in the cloud network.

20. The cloud network stability server of claim 15, wherein the remediation solution is one selected from the group comprising: restart one of the plurality of components and allocate additional components in the cloud network.

* * * * *